Jan. 11, 1938.   A. D. CARPENTER   2,104,734
TRAILER
Filed Aug. 28, 1935   2 Sheets-Sheet 1
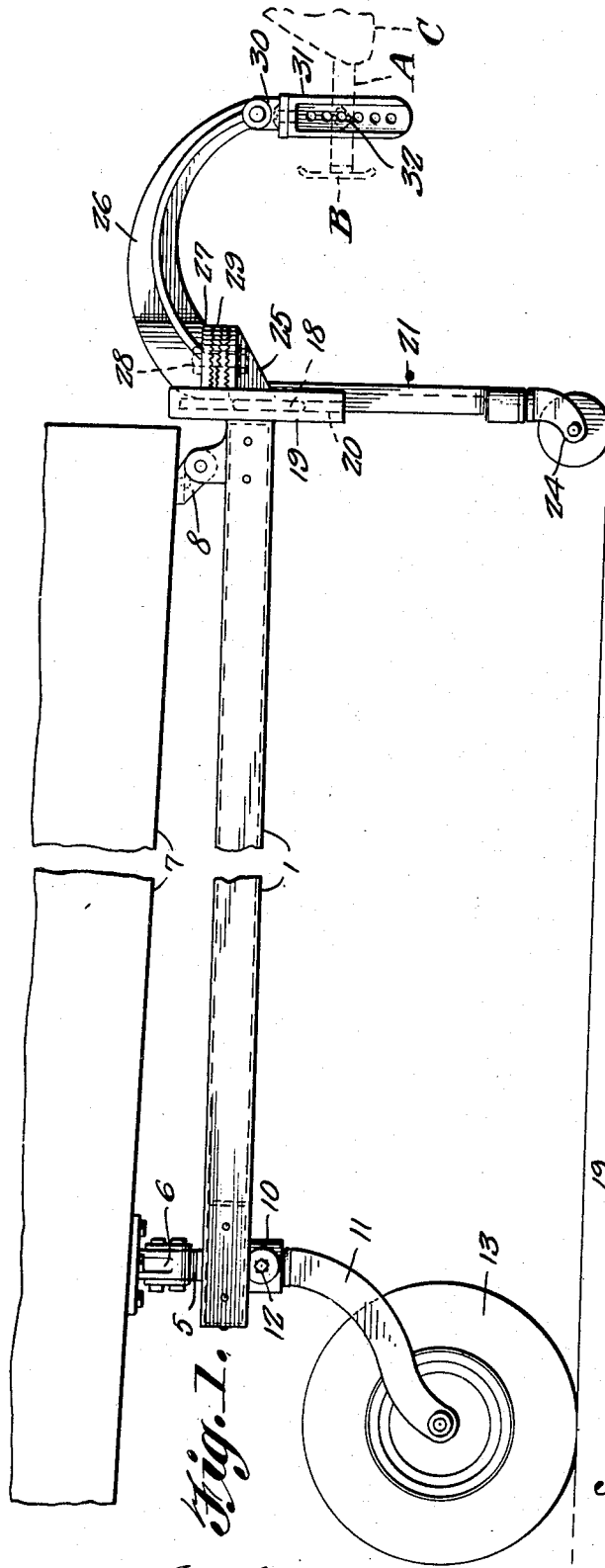
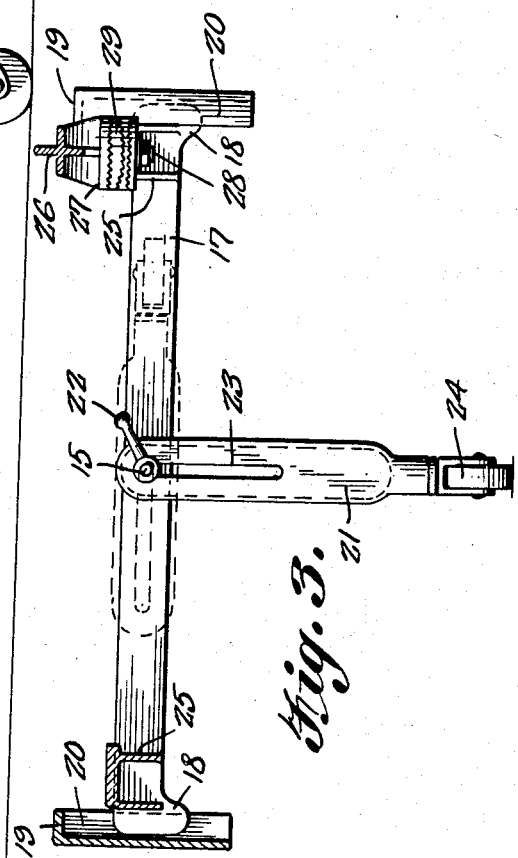
Arley D. Carpenter,
INVENTOR
BY Victor J. Evans & Co.
ATTORNEY
WITNESS Jan. 11, 1938.  A. D. CARPENTER  2,104,734
TRAILER
Filed Aug. 28, 1935   2 Sheets-Sheet 2
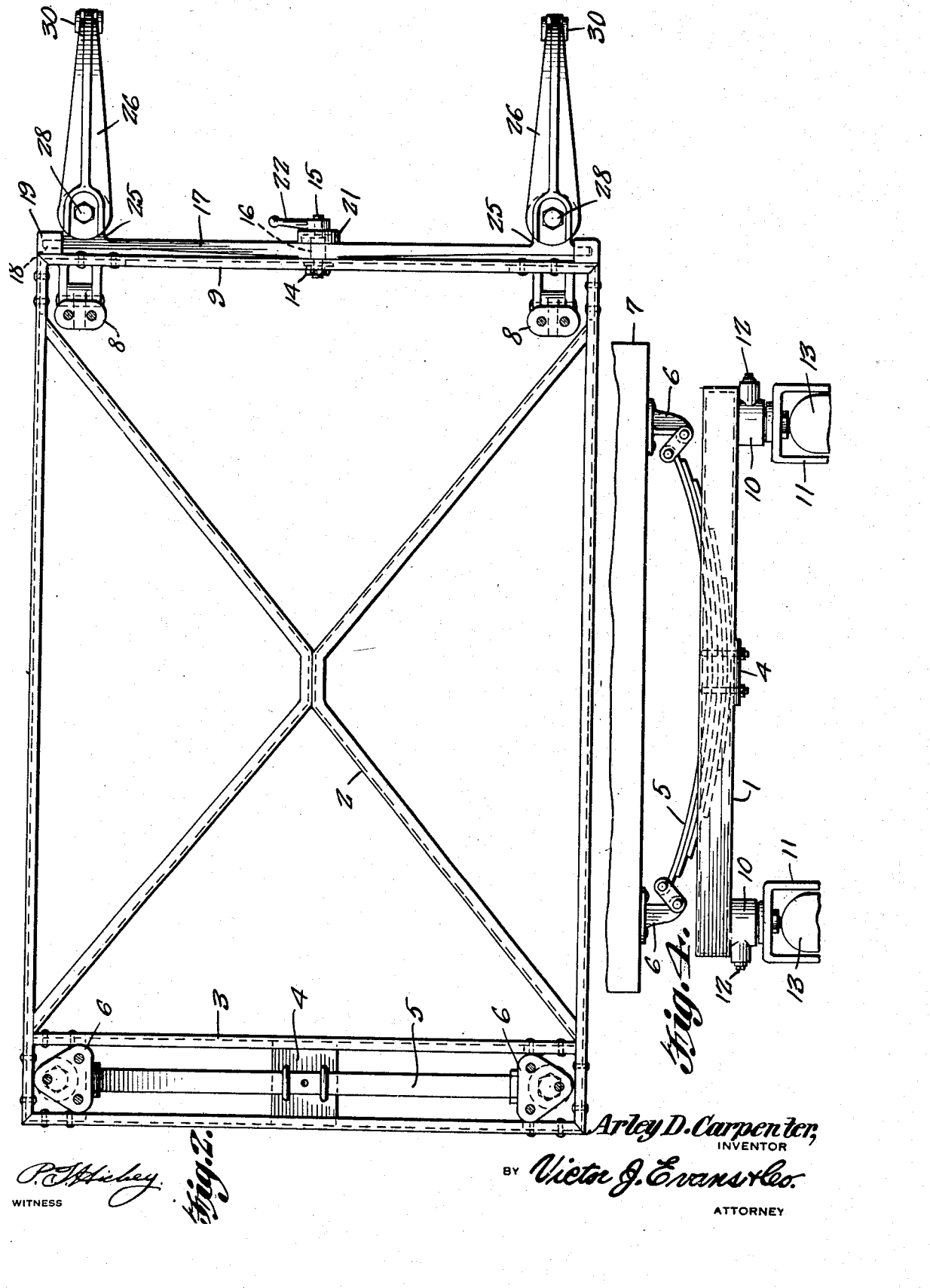
Arley D. Carpenter,
INVENTOR
BY Victor J. Evans & Co.
ATTORNEY Patented Jan. 11, 1938

2,104,734

UNITED STATES PATENT OFFICE 2,104,734

TRAILER

Arley D. Carpenter, Los Angeles, Calif., assignor to Comet Trailer Corporation, a corporation of Delaware Application August 28, 1935, Serial No. 38,300

1 Claim. (Cl. 280—33.44)

This invention relates to trailers, and its general object is to provide a trailer that is primarily designed for connection with motor vehicles, in a manner to allow travel at high speed without fear of misalignment, swaying, weaving or whipping, in that the draft connection between the trailer and vehicle includes a pair of substantially rigid securing means which likewise allows the trailer to be backed and turned with ease and accuracy when attached to the vehicle.

A further object of the invention is to provide a draft connection between the trailer and the vehicle that can be easily and expeditiously secured and removed with respect to the bumper or frame of the vehicle in minimum time, and the connecting means are adjustable to fit bumpers and frames of various heights.

Another object of the invention is to provide a trailer that is capable of being used as a hand truck when disconnected from the vehicle, in that it can be manually moved from place to place, with very little effort, and suitable means is provided for supporting the trailer when removed and which is movable and held into and out of operative position.

A further object of the invention is to provide a trailer that includes means to allow lateral rocking thereof in order to accommodate itself to all road conditions, and which together with the dual connection, permits high speeds with capacity loads.

Another object of the invention is to provide a trailer that includes caster wheels with stabilizing means therefor.

Another object of the invention is to provide a trailer of the character set forth, that is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevation illustrating the trailer which forms the subject matter of the present invention, attached to the bumper of a motor vehicle.

Figure 2 is a top plan view with the body removed.

Figure 3 is a sectional view taken transversely through the draft means for the trailer with parts in elevation, and illustrates, in full lines, the supporting leg in position for use and in dash lines in an inoperative position.

Figure 4 is a fragmentary rear view of the trailer.

Referring to the drawings in detail, it will be noted that the chassis includes a rectangular frame 1 preferably made from channel bars and reinforced by an X-frame brace 2, to assure even balance no matter where the weight is placed. The bars of the frame of the chassis may be riveted or otherwise secured together, and bridging the rear portion of the frame 1 is a transversely arranged bar 3 disposed parallel with the rear bar, with a plate 4 secured thereto for the purpose of acting as a supporting means for a leaf spring 5 that has secured to the ends thereof hanger brackets 6 for the rear portion of the body 7, while the forward portion of the body is supported by hanger brackets 8 pivotally connected between bracket members extending rearwardly from the front bar 9 of the frame, as clearly shown in Figure 2.

It is obvious that any type of body may be connected to the chassis and the one shown is merely for the purpose of illustration.

Secured between the rear bar of the frame 1 and the bar 3 thereof and at the sides of the frame are housings 10 having bearings arranged therein for the king pins of yokes 11, and each of the king pins is provided with stabilizing means in the form of brakes which are adjusted through the instrumentality of suitable means 12. The yokes have mounted between the arms thereof, wheels 13 which completes the caster wheel assembly.

Secured to the front bar 9 midway its ends, through the instrumentality of a nut 14 is a pivot pin 15, which includes a collar providing a bearing surface 16 for a rock bar 17, the latter being arranged in front of the bar 9 and is tapered toward its outer ends which are enlarged as at 18, but are flat and mounted in vertical guides, the latter being in the form of housings 19 of elongated formation and fixed to the forward corners of the frame 1, as best shown in Figure 2. The outer sides of the housings 19 are closed and the upper ends are likewise preferably closed, while the lower ends are open, and the walls 20 provide channels for the ends 18. The rock bar is held on the pivot pin 15 through the instrumentality of a leg 21 and a wrench nut 22, the latter being threaded on the pin 15 and against the leg 21, consequently it is seen that the bar 17 is mounted for rocking movement and is guided in the housings 19.

The leg is of course adapted to support the forward end of the trailer when the latter is disconnected from a vehicle, and the leg is preferably flat for the major portion of its height and has a slot 23 longitudinally arranged therein to receive the pivot pin 15 for movement thereon, so that the leg can be arranged to the respective positions, illustrated in Figure 3, and held accordingly by the wrench nut.

The flat portion of the leg is flanged so that when arranged in the dash line position of Figure 3, the flanges are disposed over and under the bar 17, to aid in fixedly associating the leg with the bar, as will be apparent. A caster wheel 24 is carried by the lower end of the leg, as shown.

Formed on and extending forwardly from adjacent the ends of the rock bar 17 are lugs 25 having openings therein and a serrated or toothed upper surface which constitutes a part of the adjusting means for adjustably securing arched or arcuate tongues 26 to the rock bar 17. The tongues as shown are of crossed web construction, with the webs increasing in width from their outer to their inner ends and the inner ends of the tongues have formed thereon disk members 27 having openings therein to receive bolt and nut connections 28 for securing the tongues to the lugs 25, the latter having disk portions corresponding to the size of the disk members 27. The members 27 are likewise provided with teeth, and disposed between the disk portions of the lugs 25 and the disk members 27 are toothed washers 29 that are wedge shaped, with the teeth thereof fitting each other and the teeth of the disk portions of the lugs 25 and the disk members 27. By that construction, it will be obvious that the wedge washers can be rotated for adjusting the elevation of the forward ends of the tongues 26 with respect to the plane of the rock bar 17.

The forward ends of the tongues 26 have pivotally secured thereto hangers 30 which have fixed thereto and depending therefrom bifurcated members 31 having aligned openings in the arms thereof, as clearly shown in Figure 1, for the purpose of receiving bolt and nut connections 32 for securing the bifurcated members to the frame A of a bumper B, as shown. However, it is of course understood that the bifurcated members can be fixed to other suitable means carried by the vehicle C, and the bolt and nut connections 32 can be in the form of U-bolts to straddle the frame A. However, it will be seen that due to the minute adjustment capable of being brought about by the wedge washer structure, that at least one of the openings of the bifurcated members can be aligned with the opening of the frame A to receive the bolt of the bolt and nut connection 32, regardless of the height of the frame, therefore the draft means can be connected to bumpers and frames of various heights in an easy and expeditious manner, and with very little effort.

The particular mounting, aside from providing for adjustment to vary the elevation of the forward ends of the hangers with respect to the plane of the rock bar, also provides for hanger adjustment angularly in a horizontal plane to vary the spacing between the forward ends of the hangers.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

The combination with a vehicle and a trailer, of draft means therefor to maintain axial alignment thereof and comprising a transverse bar pivotally mounted midway its ends to the trailer, housings secured to the trailer and receiving the opposite ends of the transverse bar to guide the same, lugs extending forwardly from adjacent the ends of the transverse bar, curved tongues having one of their ends connected to the lugs, toothed and wedge adjusting means included in the connecting means for the tongues, and means for detachably and adjustably connecting the opposite ends of the tongues to the vehicle.

ARLEY D. CARPENTER.